US006396529B1

(12) United States Patent
Miyoshi et al.

(10) Patent No.: US 6,396,529 B1
(45) Date of Patent: May 28, 2002

(54) OPTICAL PRINTER HEAD, LIGHT-AMOUNT CORRECTION METHOD FOR OPTICAL PRINTER HEAD AND OPTICAL PRINTER

(75) Inventors: Rie Miyoshi; Yawara Inoue; Yukihiko Shimizu, all of Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 09/556,522

(22) Filed: Apr. 21, 2000

(30) Foreign Application Priority Data

Apr. 23, 1999 (JP) ............................................. 11-116340

(51) Int. Cl.$^7$ ................................................ B41J 2/435
(52) U.S. Cl. ....................................... 347/236; 347/237
(58) Field of Search ................................ 347/236, 238, 347/253, 122, 130, 237, 246, 247

(56) References Cited

U.S. PATENT DOCUMENTS 4,949,101 A * 8/1990 Shimizu ...................... 347/238
6,201,559 B1 * 3/2001 Wada et al. ................. 347/236

* cited by examiner

*Primary Examiner*—Hai Pham
(74) *Attorney, Agent, or Firm*—Oblon, Spivak, McClelland, Maier & Neustadt, P.C.

(57) ABSTRACT

An optical printer head capable of increasing a level of a light amount for exposure emitted from luminous dot trains in view of an end cool phenomenon of filamentary cathodes and reducing loss of exposure energy. A light source includes luminous dot trains each constituted by a plurality of luminous dots each including an anode arranged on an anode substrate and a phosphor layer deposited on the anode, as well as filamentary cathodes arranged above the luminous dot trains so as to extend along the trains. A memory device is arranged so as to store therein correction information for ensuring uniform luminescence of the luminous dots. Light-amount correction is carried out on the luminous dots other than those positioned in proximity to each of both ends of the luminous dot trains excluded from light-amount correction, to thereby obtain correction information on the former luminous dots, which is then stored in the memory device. The correction information permits a light amount of each luminous dot to be substantially distributed around a minimum value of a light amount of all luminous dots stored in the memory device.

7 Claims, 5 Drawing Sheets

OPTICAL PRINTER HEAD, LIGHT-AMOUNT CORRECTION METHOD FOR OPTICAL PRINTER HEAD AND OPTICAL PRINTER

BACKGROUND OF THE INVENTION

This invention relates to an optical printer head including a light source constituted of a plurality of luminous dots, a light-amount correction method for correcting a light amount of luminous dots in the optical printer head so as to render the light amount uniform, and an optical printer for emitting light therefrom toward a record medium to form an image thereon.

The assignee proposed an optical printer wherein a fluorescent luminous tube acting as a luminous device is used as a light source for an optical printer head to form an image on a record medium such as, for example, a silver salt convenience film or the like.

Figure 6:
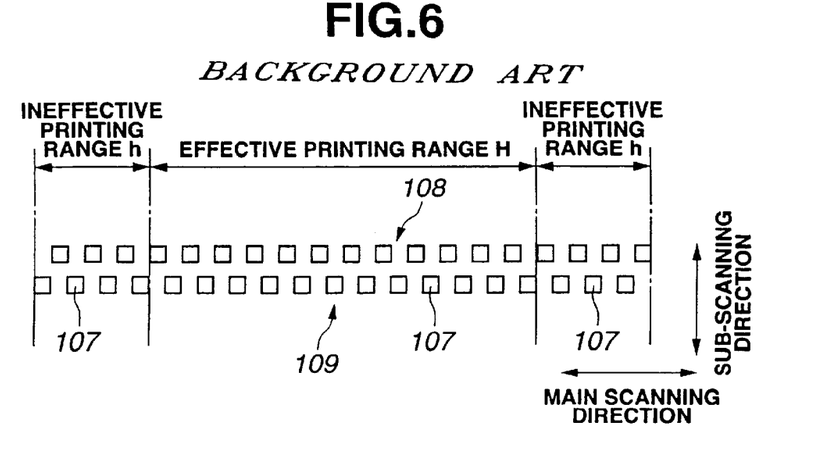
FIG. 6 is a plan view showing arrangement of luminous dots in a prior art.

The optical printer head constituted by the fluorescent luminous tube in the proposed optical printer includes an envelope of which an interior is evacuated at a high vacuum. The envelope is formed by assembling insulating substrates made of a glass plate or the like into a box-like structure. An anode substrate which constitutes a part of the envelope is formed on an inner surface thereof with anodes on each of which a phosphor layer emitting light due to impingement of electrons thereon is deposited. The anodes and phosphor layers, as shown in FIG. 6, cooperate with each other to constitute two luminous dot trains 108 and 109, which are formed by arranging a plurality of luminous dots 107 in two rows and in an offset manner in a main scanning direction. Also, the anode substrate is provided on the inner surface thereof with a plane control electrode, which is arranged so as to surround the luminous dots 107 and anode wirings. The envelope has filamentary cathodes stretchedly arranged therein so as to be positioned above the luminous dot trains 108 and 109 and extend along the luminous dot trains or in the main scanning direction. The filamentary cathodes each include a core wire made of tungsten or the like and an electron emitting material deposited on the core wire.

Feeding of electricity to each of the cathodes permits the core wire to generate heat, resulting in electrons being emitted from the electron emitting material. The electrons thus emitted are permitted to impinge on the phosphors of the anodes to which a drive voltage is selectively applied, resulting in the luminous dots selectively emitting light. The plane control electrode has a positive voltage constantly applied thereto during driving of the optical printer head, to thereby render an electric field in its neighboring region uniform.

In the optical printer thus constructed, a record medium and the optical printer head are moved relative to each other in a sub-scanning direction perpendicular to the main scanning direction of the luminous dot trains 108 and 109 during recording operation. Also, data on an image to be formed are fed to the optical printer head, to thereby permit the luminous dots 107 to emit light at predetermined timings in synchronism with relative movement between the record medium and the optical printer head. Such driving permits light of the luminous dots 107 of the optical printer head to be successively irradiated in a line parallel to the main scanning direction on the record medium for exposure thereof, leading to formation of the image on the record medium.

Figure 7:
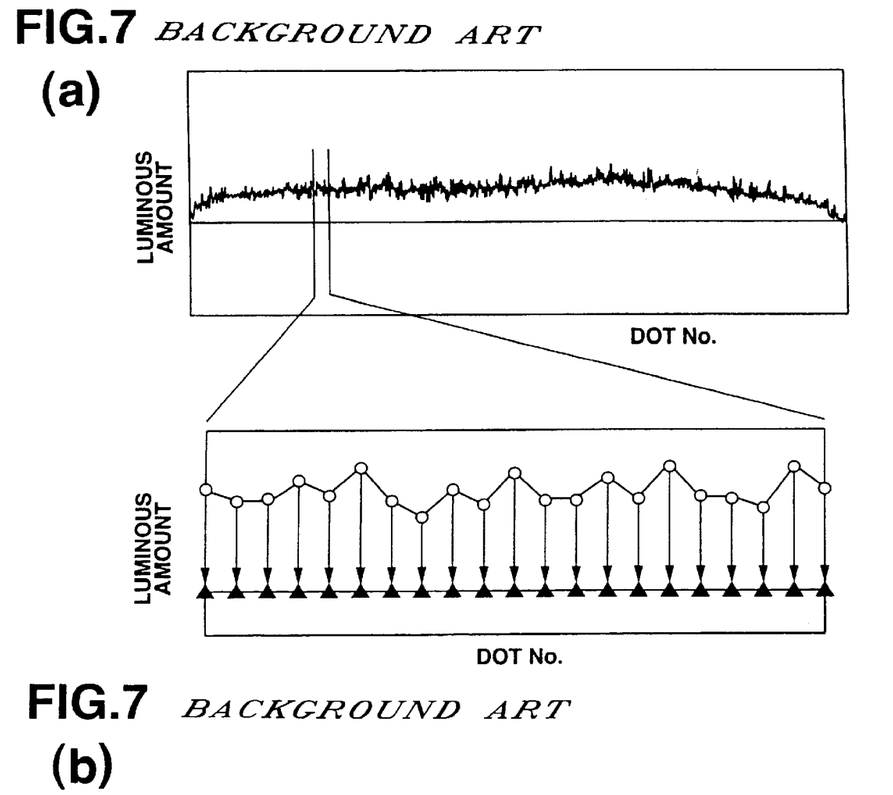
FIGS. 7a and 7b diagrammatic views showing light amounts before and after correction in a conventional light-amount correction method.

The luminous dots 107 of the optical printer head are varied in light amount or luminous intensity as indicated in FIG. 7(a) wherein a light amount of each of the luminous dots is found by measuring light amounts of all luminous dots 107. Also, the record medium on which recording operation is carried out by the optical printer head is generally constructed so as to carry out color development depending on a level of energy of light applied thereto or intensity of the light. Such construction of the record medium, when a light amount is varied among the luminous dots, causes a degree of color development of the record medium such as, for example, a density of a color developed on the record medium or the like to be varied at every portion of the record medium on which light is irradiated from each of the luminous dots.

In order to eliminate a variation in color development occurring on the record medium due to a variation in light amount among the luminous dots 107, it is carried out to measure a light amount of each of all luminous dots 107 obtained when the luminous dots are driven for luminescence under the same conditions. Then, a value required to keep a level of luminescence of each of the luminous dots uniform or constant is calculated from the light amount of each of the luminous dots 107 and then stored in the form of information for correction in a ROM or the like. The value may be, for example, information for controlling lighting time of each of the luminous dots. When the luminous dots are used for an optical printer, the thus-stored correction information of each of the luminous dots is used for control which permits the light amounts of all luminous dots 107 to be kept constant or uniform. The control may be, for example, control of lighting time of the luminous dots. More specifically, as shown in FIG. 7B, a level of the light amount of each of the luminous dots is adjusted so that the light amount of each of the luminous dots is aligned with that of the luminous dot 107 having a minimum light amount, resulting in ensuring that an image at a uniform density is obtained on the record medium.

However, the fluorescent luminous tube acting as a light source for the optical printer head is so constructed that the filamentary cathodes each are welded at both end thereof to a stretch fitment, to thereby be stretchedly arranged in the envelope. Such construction causes a part of heat generated by the core wire of each of the filamentary cathodes to be absorbed by the stretch fitment. This fails to increase a temperature of the cathode to a level sufficient to permit the cathode to emit electrons, leading to an end cool phenomenon which causes both ends of the cathode to fail to emit a sufficient amount of electrons as compared with a central portion thereof. More specifically, this causes a substantial difference in light amount between the luminous dots 107 positioned at both ends of the cathodes and those positioned at other regions thereof, so that the luminous dots 107 at both ends are decreased in light amount as compared with those at the other regions.

Light-amount correction of the luminous dots 107 which is carried out in the prior art in order to eliminate such a difference in light amount causes light amounts of all luminous dots 107 to be corrected so as to be at a level of light amounts of the luminous dots positioned at both ends of the fluorescent luminous tube defined in the main scanning direction.

Also, in the record medium exposed to light emitted from the optical printer head, the luminous dots 107 arranged at both ends of the fluorescent luminous tube in the main scanning direction, as shown in FIG. 6, are positioned out of an effective printing range H or allocated to an ineffective printing range h which permits a variation in light amount of the luminous dots 107 to be substantially disregarded.

Thus, light-amount correction of the luminous dots 107 causes all luminous dots 107 to be set at a light-amount level equal to that of the luminous dots 107 which are out of the effective printing range H or in the ineffective printing range h which permits a variation in light amount of the luminous dots 107 to be substantially disregarded. This leads to a reduction in light amount of the luminous dots 107 in the effective printing range H which contributes to recording on the record medium, so that the luminous dot trains 108 and 109 fail to feed exposure energy at a sufficient level to the record medium without adversely affecting quality of an image to be formed, resulting in loss of the exposure energy.

SUMMARY OF THE INVENTION

The present invention has been made in view of the foregoing disadvantage of the prior art.

Accordingly, it is an object of the present invention to provide an optical printer head which is capable of increasing a level of a light amount for exposure emitted from luminous dot trains in view of an end cool phenomenon caused by filamentary cathodes.

It is another object of the present invention to provide an optical printer head which is capable of reducing loss of exposure energy.

It is a further object of the present invention to provide a light-amount correction method for an optical printer head which is capable of correcting a light amount of luminous dots in view of an end cool phenomenon caused by filamentary cathodes.

It is still another object of the present invention to provide an optical printer which is capable of ensuring formation of an image increased in quality on a record medium in view of an end cold phenomenon caused by filamentary cathodes.

In accordance with one aspect of the present invention, an optical printer head is provided. The optical printer head includes a light source constituted by luminous dot trains each including a plurality of luminous dots and a memory device for storing therein correction information obtained by light-amount correction carried out for ensuring uniform luminescence of the luminous dots. The light-amount correction is carried out on the luminous dots in an effective printing range of the luminous dot trains other than the luminous dots in an ineffective printing range of the luminous dot trains while omitting the luminous dots in the ineffective printing range from the light-amount correction, so that correction information obtained by the light-amount correction carried out on the luminous dots in the effective printing range is stored in said memory device. In the optical printer head of the present invention, the luminous dots of each of the luminous dot trains of the light source each include an anode arranged on an anode substrate and a phosphor layer deposited on the anode. The light source also includes filamentary cathodes arranged above the luminous dot trains so as to extend along the luminous dot trains. In the optical printer head of the present invention, the ineffective printing range includes luminous dots positioned in proximity to each of both ends of the luminous dot trains. The luminous dots in the ineffective printing range each may exhibit a light amount of about 80% or less based on an average light amount of the luminous dot trains. The luminous dots in the ineffective printing range may be constantly kept excited for luminescence, wherein a record medium which is rendered white due to exposure thereof to light of the luminous dots may be used, resulting in a white frame being formed on each of both ends of the record medium. The correction information may be based on a minimum value of a light amount of the luminous dots in the effective printing range.

In accordance with another aspect of the present invention, a light-amount correction method for an optical printer head is provided. The light-amount correction method includes the steps of measuring luminescent output of each of luminous dot trains constituted by a plurality of luminous dots and carrying out light-amount correction for rendering a light-amount of each of the luminous dots uniform depending on the luminescent output measured, to thereby previously obtain correction information, resulting in carrying out the light-amount correction of the luminous dots depending on the correction information. The light-amount correction is carried out on the luminous dots in an effective printing range of the luminous dot trains other than the luminous dots in an ineffective printing range of the luminous dot trains while omitting the luminous dots in the ineffective printing range from the light-amount correction, so that correction information obtained by the light-amount correction carried out on the luminous dots in the effective printing range is stored in the memory device, leading to the light-amount correction of the luminous dots in the effective printing range. In the method of the present invention, the ineffective printing range includes luminous dots positioned in proximity to each of both ends of the luminous dot trains. The correction information is based on a minimum value of a light amount of the luminous dots in the effective printing range.

In accordance with a further aspect of the present invention, an optical printer is provided. The optical printer includes a light source including luminous dot trains each constituted by a plurality of luminous dots, a record medium irradiated thereon with light from the light source, resulting in an image being formed thereon, a transfer means for moving the light source and record medium relative to each other, a control means for driving the transfer means and light source in synchronism with each other, and a memory device for storing therein correction information obtained by light-amount correction carried out for ensuring uniform luminescence of the luminous dots. The light-amount correction is carried out on the luminous dots in an effective printing range of the luminous dot trains other than the luminous dots in an ineffective printing range of the luminous dot trains while omitting the luminous dots in the ineffective printing range from the light-amount correction, so that correction information obtained by the light-amount correction carried out on the luminous dots in the effective printing range is stored in the memory device, leading to driving of the light source depending on the correction information. In the optical printer of the present invention, the luminous dots of each of the luminous dot trains of the light source each include an anode arranged on an anode substrate and a phosphor layer deposited on the anode. The light source also includes filamentary cathodes arranged above the luminous dot trains so as to extend along the luminous dot trains. In the optical printer of the present invention, the ineffective printing range includes luminous dots positioned in proximity to each of both ends of the luminous dot trains. The correction information may be based on a minimum value of a light amount of the luminous dots in the effective printing range.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described hereinafter with reference to FIGS. 1 to 5.

Referring first to FIGS. 1 to 4, an embodiment of an optical printer according to the present invention is illustrated. An optical printer of the illustrated embodiment includes an optical printer head 1 acting as a light source and constituted by a fluorescent luminous tube. The optical printer head 1 includes an envelope 6 formed by sealedly assembling an anode substrate 3, side plates (not shown) and a rear substrate 5 into a box-like structure by means of a seal glass. The envelope 6 is evacuated at a high vacuum.

Figure 1:
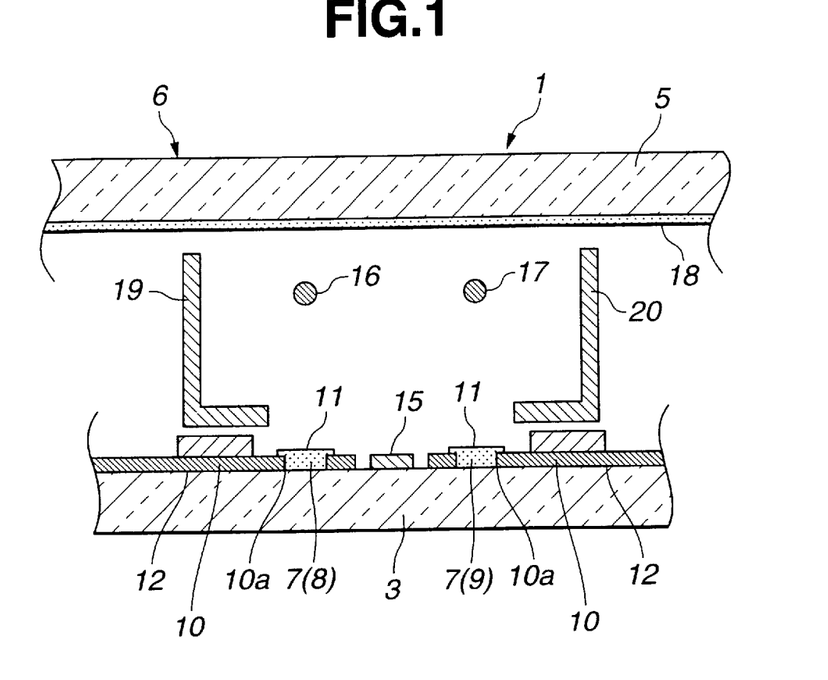
FIG. 1 is a fragmentary sectional view showing an embodiment of an optical printer head according to the present invention.

The anode substrate 3, as shown in FIG. 1, is provided on an inner surface thereof with first and second luminous dot trains 8 and 9 each constituted of a plurality of luminous dots 7 so as to extend in a longitudinal direction of the anode substrate 3. The luminous dots 7 each include an anode conductor 10 formed of a frame-like conductive film made of aluminum or the like and arranged on the anode substrate 3 and a phosphor layer 11 deposited on the anode conductor 10.

The phosphor layer 11 may be made of, for example, a ZnO:Zn phosphor and formed into an area larger than a rectangular opening 10a of the anode conductor 10 while being prevented from projecting from the frame. Luminescence of the phosphor layer 11 is discharged through the opening 10a of the anode conductor 10 and the anode substrate 3 to an outside of the anode substrate 3. Thus, an area of each of the luminous dots 7 is defined by an effective luminous area of the phosphor layer defined by the opening 10a of the anode conductor 10.

Figure 4:
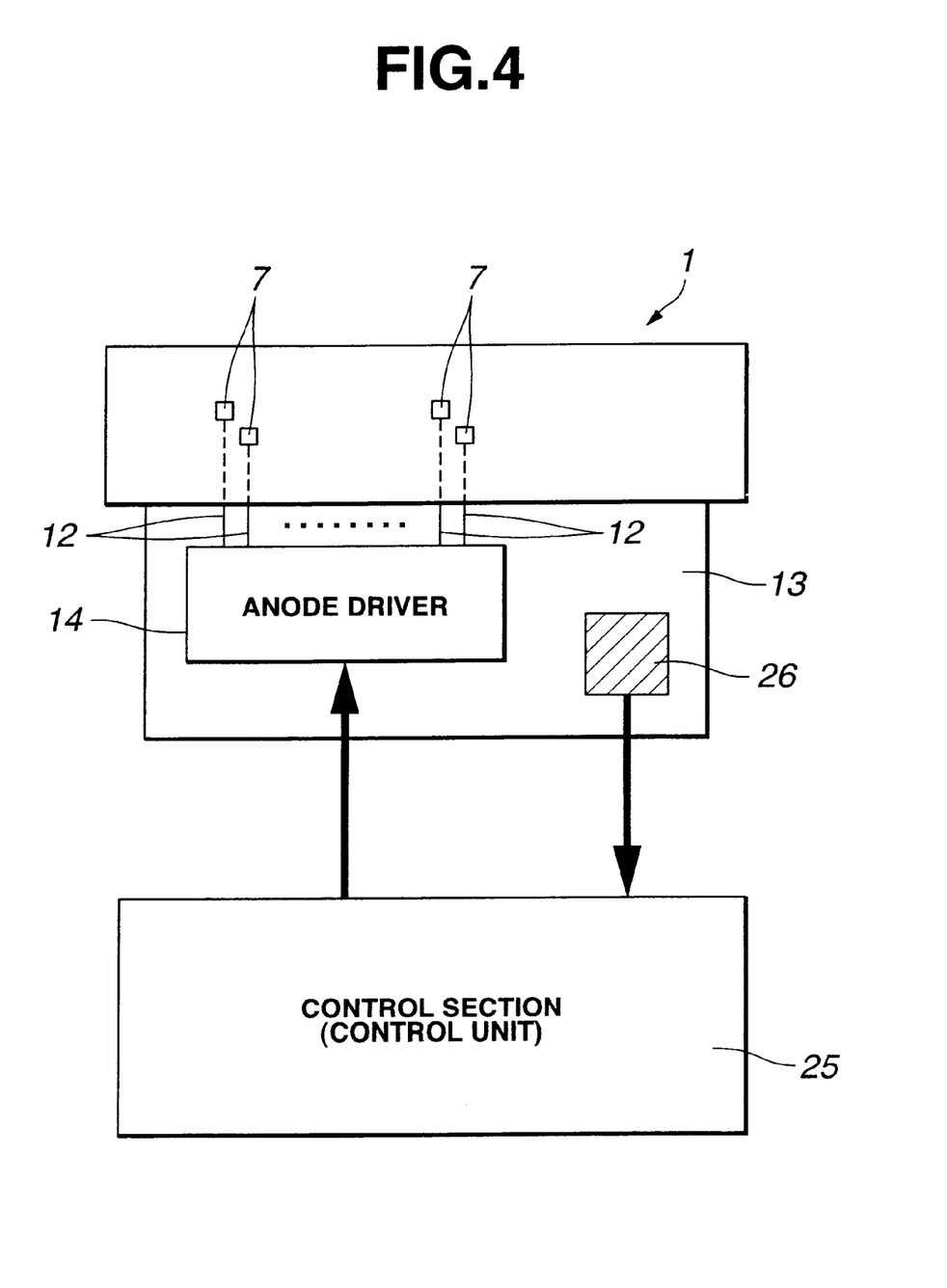
FIG. 4 is a block diagram showing a connection structure in the optical printer head shown in FIG. 1.
Figure 5:
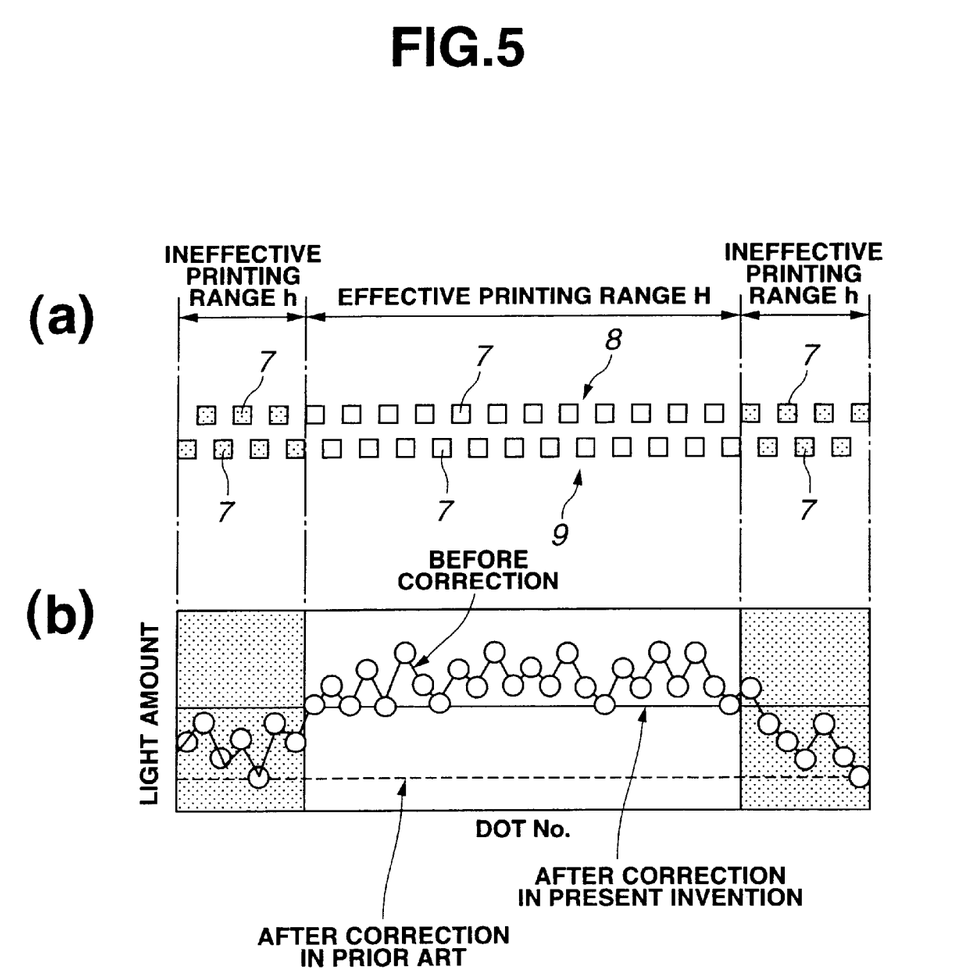
FIGS. 5a and 5b diagrammatic views showing light amounts before and after correction in a light-amount correction method according to the present invention and comparison with a light amount after correction in a conventional light-amount correction method.

The luminous dots 7 constituting the luminous dot trains 8 and 9 are led out to an outside of the luminous dot trains 8 and 9 through anode wirings 12 and then connected to anode driver 14 of an IC arranged on a circuit board 13 so as to act as a drive device, as shown in FIG. 4.

Figure 2:
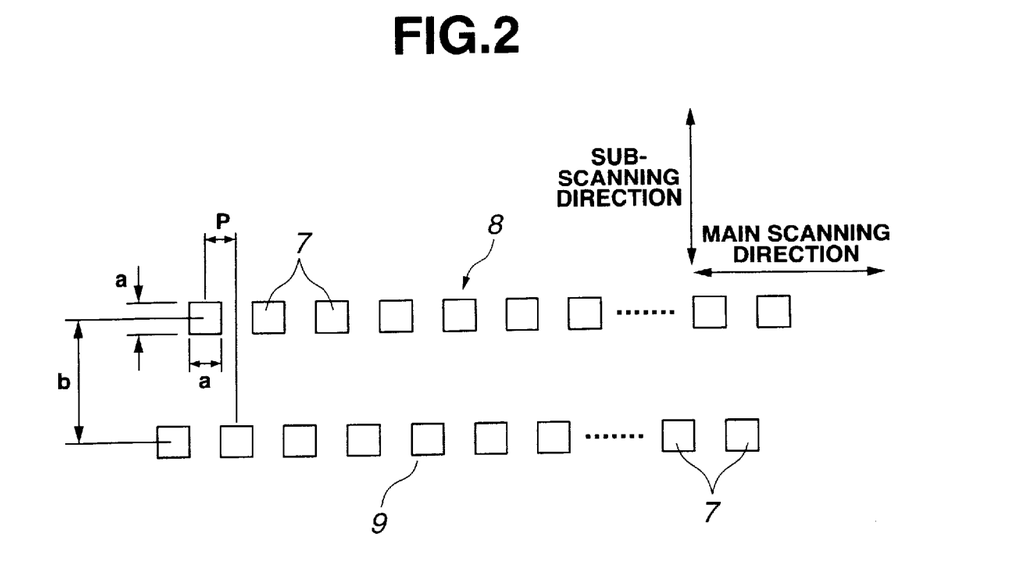
FIG. 2 is a plan view of the optical printer head shown in FIG. 1.

Now, a configuration of the luminous dots 7 and arrangement of the first and second luminous dot trains 8 and 9 will be described. As shown in FIG. 2, the luminous dots 7 each are formed into a square of which a side has a length a. The first and second luminous dot trains 8 and 9 each are constituted by a plurality of the luminous dots 7 arranged at predetermined intervals a in the main scanning direction. The luminous dots 7 constituting the luminous dot train 8 and those constituting the luminous dot train 9 are arranged in parallel to each other and in an offset manner while being shifted from each other by a pitch P (=a) in the main scanning direction and spaced from each other by a pitch b in the sub-scanning direction. The pitch b is defined to be integral times as large as the pitch P in the main scanning direction.

The anode substrate 3, as shown in FIG. 1, is provided on an upper surface thereof with a plane control electrode 15. The plane control electrode 15 is formed of a conductive film made of aluminum or the like and arranged in the same plane as the luminous dots 7 while surrounding the luminous dots 7, anode wirings 12 and the like. The plane control electrode 15 has a positive voltage constantly applied thereto during driving of the optical printer, resulting in rendering a neighboring electric field uniform.

The envelope 6, as shown in FIG. 1, has a first filamentary cathode 16 and a second filamentary cathode 17 stretchedly arranged therein in a manner to be positioned above the first and second luminous dot trains 8 and 9, respectively. The first and second filamentary cathodes 16 and 17 are arranged so as to extend in the main scanning direction of the luminous dot trains 8 and 9 and welded at both ends thereof to a stretch fitment (not shown), to thereby stretched. The first and second filamentary cathodes 16 and 17 each include a core wire made of tungsten or the like and an electron emitting substance deposited on the core wire.

The rear substrate 5 is formed on an inner surface thereof with an antistatic nesa film 18 which is constituted by a light-permeable conductive film. The nesa film 18 is formed on a front surface thereof with an antireflection layer. The antireflection layer functions to absorb light emitted from the luminous dots (anodes) 7 to prevent the light from being reflected toward the luminous dots 7 by the rear substrate 5. Absence of the antireflection layer causes the light to be reflected toward a luminous side, resulting in leakage of the light through a gap between the anode conductor 10 and the plane control electrode 13, leading to a reduction in contrast.

The envelope 6, as shown in FIG. 1, is provided therein with a first shield electrode 19, which is positioned outside the luminous dot train 8 and first cathode 16. Also, the envelope 6 has a second shield electrode 20 provided therein so as to be positioned outside the luminous dot train 9 and second cathode 17. The first and second shield electrodes 19 and 20 each are made of a plate member of a substantially L-shape in section as viewed in a plane perpendicular to the main scanning direction and has a flange plate section arranged in parallel to a front surface of the anode substrate 3. The flange plate section of each of the shield electrodes 19 and 20 is arranged above the anode substrate 3 with a fine gap as small as about 0.3 mm or less being defined therebetween or through an insulating layer. The shield electrodes 19 and 20 have an upper end arranged so as to upwardly extend beyond the filamentary cathodes 16 and 17, resulting in surrounding the cathodes 16 and 17 in cooperation with each other. The first and second shield electrodes 19 and 20 function to prevent a reactive current from flowing into wirings of the luminous dots 7, a wiring of the plane control electrode 15 and the like to hinder uniform luminescence of the luminous dots. Also, a restriction of a width of an opening defined between the first shield electrode 19 and the second shield electrode 20 permits a reduction in reactive current flowing to the plane control electrode 15 and luminous dots 7.

Figure 3:
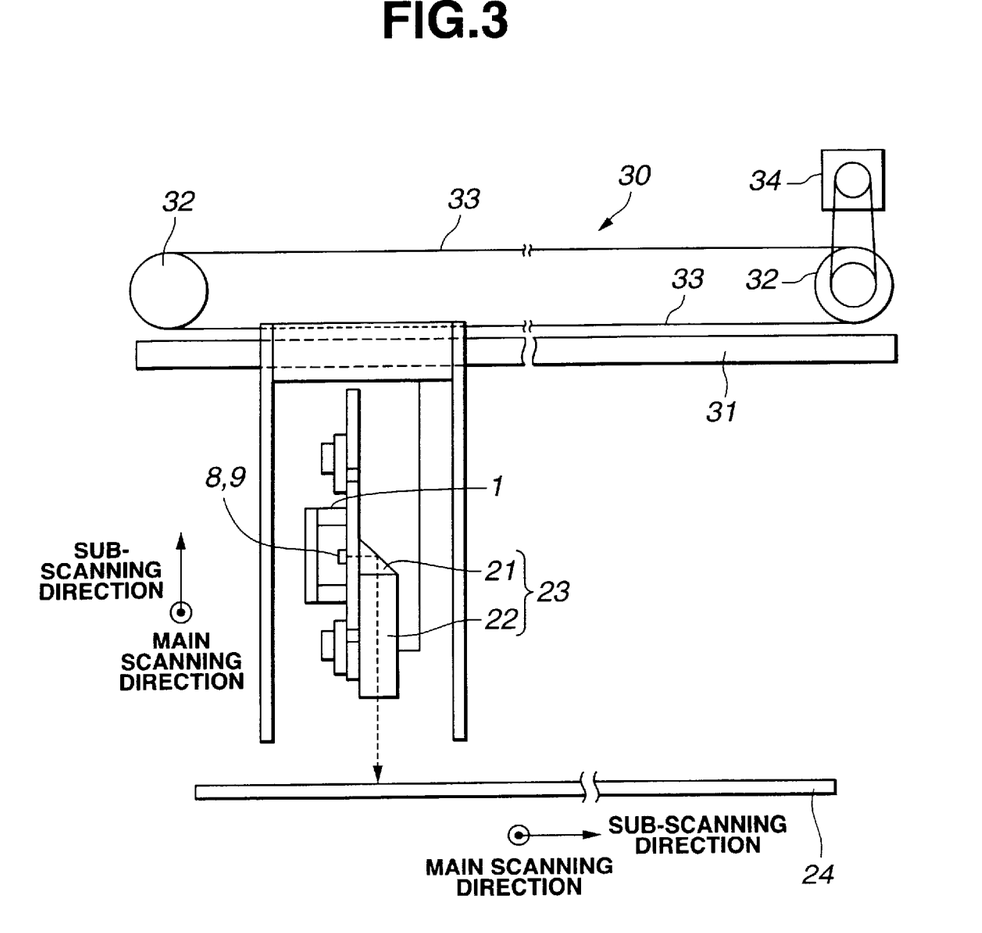
FIG. 3 is a schematic side elevation view showing an embodiment of an optical printer according to the present invention.

As shown in FIG. 3, the luminous dot trains 8 and 9 of the optical printer head 1 are so arranged that the main scanning direction is defined in a horizontal direction or a direction normal to the sheet of FIG. 3 and the sub-scanning direction is defined in a vertical direction or an upper direction in FIG. 3. Dot-like light emitted from the luminous dots 7 is directed forwardly in the horizontal direction or in a right-hand direction in FIG. 3 through the light-permeable anode substrate 3. The anode substrate 3 of the optical printer head 1 is provided on a front surface side thereof with an image formation optical system 23 constituted of, for example, a prism (or a reflection mirror) 21 and a selfoc lens array 22.

The image formation optical system 23 has a focal position defined at the opening 10a of the anode conductor 10 of the optical printer head 1 and an image projection position defined on a photosensitive surface of a film 24 such as, for example, a silver salt convenience film which acts as the record medium, resulting in forming an erected real image at an equi-magnification or an equi-magnification erected real image on the record medium. A light path of dot-like light emitted forwardly of the anode substrate 3 from the optical printer head 1 is orthogonally shifted, so that the light is directed in a vertically downward direction. On the photosensitive surface of the horizontal film 24 acting as the record medium, the main scanning direction of the luminous dots 7 is defined in a horizontal direction or a direction normal to the sheet of FIG. 3 and the sub-scanning direction thereof is defined in a horizontal direction or a right-hand direction in FIG. 3.

Operation of recording an image on the record medium is carried out by actuating a transfer means 30 to move the record medium or film 24 in the subs-scanning direction relative to light emitted from the optical printer head 1. Then, a control means or control section 25 is driven to feed the optical printer head 1 with data on an image to be formed, to thereby permit luminescence of the luminous dot trains 8 and 9 in synchronism with the above-described relative movement.

The transfer means 30, as shown in FIG. 3, includes, for example, a pair of guide shafts 31 arranged in parallel to each other and so as to extend in the sub-scanning direction of the record medium or film 24. The guide shafts 31 each are provided on both end sides thereof with pulleys 32. The pulleys 32 have an endless wire wound thereon so as to extend therebetween. Also, one of the pulleys 32 is driven by a pulse motor 34, so that the wire 33 may be circulatedly moved between the pulleys 32. The optical printer head 1 is guided to the guide shaft 31 and fixed at a part thereof to the wire 33. Thus, the transfer means 30 drives the pulse motor 34 to circulate the wire 33, so that the optical printer head 1 may be moved in the sub-scanning direction of the record medium or film 24 while being guided by the guide shaft 31.

The control section or control unit 25 acting as the control means includes a CPU, a RAM and a ROM and is connected through an interface to the anode driver 24 as shown in FIG. 4. The circuit board 13 on which the anode driver 14 is mounted is mounted thereon with a memory device 26 which may be constituted by a ROM or the like. The memory device 26 has correction information corresponding to a light amount of each of the luminous dots 7 stored therein. The correction information is calculated by a procedure described below. The memory device 26 is connected to the control section 25, so that the control section 25 may read the correction information stored in the memory device 26.

Synchronous driving of the transfer means 30 and control means or control section 25 permits light emitted from each of the luminous dots 7 of the luminous dot trains 8 and 9 arranged in an offset manner in the optical printer head 1 to be successively irradiated in a straight line parallel to the main scanning direction on the film or record medium 24. Such irradiation of light emitted from the optical printer head 1 being moved on the record medium or film 24 leads to formation of a desired image on the film 24.

The optical printer head constituted by the fluorescent luminous tube, as described above, is so constructed that the first and second filamentary cathodes 16 and 17 each are fixed at both ends thereof on the stretch fitment. The stretch fitment causes an end cool phenomenon of absorbing a part of heat generated from the core wire of each of the cathodes 16 and 17 being fed with electricity. This fails to permit a temperature of both ends of the cathodes 16 and 17 to be increased to a level which permits the cathodes to emit electrons, so that discharge of electrons from both ends of the cathodes is insufficient or reduced as compared with that from a central region thereof. This causes a light amount of the luminous dots 7 positioned in proximity to both ends of the optical printer head 1 defined in the main scanning direction to be reduced as compared with that of the luminous dots positioned at a region thereof other than both ends.

The luminous dots 7 positioned in proximity to both ends of the optical printer head in the main scanning direction which are reduced in light amount, as shown in FIG. 5(a), constitute an ineffective printing region h out of an effective printing range H which permits printing on the film 24.

In view of the foregoing, the illustrated embodiment is constructed so as to carry out light-amount correction described hereinafter without subjecting the luminous dots 7 in the ineffective printing range h to the correction.

More specifically, the film 24 generally used as the record medium may generally have the effective printing range H set to be 73 mm in the main scanning direction. Also, a whole width of the luminous dot trains 8 and 9 of the optical printer head 1 in the main scanning direction which form an image on the film 24 may be set to be 80 mm =125 $\mu$m×640 dots. This causes the whole ineffective printing range h to be 7 mm=80 mm−73 mm, resulting in the ineffective printing range h at each of both ends in the main scanning direction being 3.5 mm (28 dots). In the illustrated embodiment, the luminous dots of 20 in number are in the ineffective printing range h at each of both ends of the luminous dot trains 8 and 9.

Also, in the luminous dot trains 8 and 9 each constituted by the luminous dots of 640 in number, it was verified that about 50 luminous dots 7 at each of both ends of each of the luminous dot trains 8 and 9 are drastically reduced in light amount. Also, it was found that the luminous dots in a region of about 2 to 3 mm defined at both ends of the effective printing range H do not cause nonuniform exposure or a variation in exposure which is visually recognized. Thus, a region of 6.25 mm (=50 dots×125 $\mu$m) at each of both ends of the optical printer head in the main scanning direction may be regarded as the ineffective printing range h to be omitted.

Further, it was found that when the luminous dot trains 8 and 9 of the optical printer head 1, as described above, each are constituted of the luminous dots of 640 in whole number which are arranged in the main scanning direction, a light amount of the luminous dots of 20 to 50 in number positioned at each of both ends thereof is about 80% or less on the basis of an average light amount obtained by driving all luminous dots 7 under the same conditions and about 70% or less on the basis of a maximum light amount obtained thereby. Thus, it is preferable that the luminous dots 7 exhibiting a light amount of about 80% or less based on the average light and that of about 70% or less based on the maximum light amount are considered to be in the ineffective printing range h, resulting in being omitted from the correction.

Now, light-amount correction of the luminous dots 7 of the optical printer head 1 carried out without subjecting the luminous dots 7 in the predetermined ineffective printing range h to the correction or while omitting the luminous dots 7 in the ineffective printing range from the correction will be described.

Correction information corresponding to a light amount of the luminous dots 7 after omitting the luminous dots 7 in the predetermined ineffective printing range h from the correction is calculated and then stored in the memory device 26. Now, calculation of the correction information will be described.

First of all, all luminous dots 7 of the optical printer head 1 are excited for luminescence under the same drive conditions. At this time, a light amount (luminous output) of each of the luminous dots 7 in the effective printing range H is obtained as data shown in FIG. 5(b).

Then, a minimum value Lmin is found from the light-amount data thus obtained. The minimum value Lmin indicates a light amount of the luminous dots 7 positioned in proximity to both ends of the effective printing range H of the luminous dot trains 8 and 9 and acts as a reference light-amount level during the light-amount correction.

Thereafter, correction information C(i) required for merging a light amount of each of the remaining luminous dots 7 into the light amount of the luminous dots concerned with the minimum value Lmin is calculated. The calculation is carried out according to a formula $C(I)=Lmin/L(i)$, wherein i indicates a dot number.

The correction information C(i) is caused to correspond to a pulse width of control data inputted to the anode driver 14. More particularly, a set range of the correction information is classified into a predetermined number of ranks depending on a ratio between a maximum value of the light amount of all luminous dots 7 and a minimum thereof, wherein each of the ranks is represented by correction information on an upper limit value thereof, so that a pulse width of each of the ranks is determined in correspondence to control data inputted to the anode driver 14 at the time when the correction information C(1) is 1 (C(i)=1). The pulse width thus determined is caused to correspond to correction information corresponding to each of the ranks. The pulse width constitutes a reference pulse width.

Table 1 described below shows that the pulse width of the control data inputted to the anode driver 14 is classified into 15 ranks when a ratio between a maximum value of the light amount of all luminous dots 7 and a minimum value thereof is 1:0.7, by way of example.

TABLE 1

| Rank | Correction Data C(i) | Anode Pulse Width (μsec) |
|---|---|---|
| 1.0 ≧ C(i) > 0.979 | 1.0 | 141.0 |
| 0.979 ≧ C(i) > 0.957 | 0.979 | 138.0 |
| 0.957 ≧ C(i) > 0.936 | 0.957 | 135.0 |
| 0.936 ≧ C(i) > 0.915 | 0.936 | 132.0 |
| 0.915 ≧ C(i) > 0.894 | 0.915 | 129.0 |
| 0.894 ≧ C(i) > 0.872 | 0.894 | 126.0 |
| 0.872 ≧ C(i) > 0.850 | 0.872 | 123.0 |
| 0.850 ≧ C(i) > 0.830 | 0.850 | 120.0 |
| 0.830 ≧ C(i) > 0.809 | 0.830 | 117.0 |
| 0.809 ≧ C(i) > 0.787 | 0.809 | 114.0 |

TABLE 1-continued

| Rank | Correction Data C(i) | Anode Pulse Width (μsec) |
|---|---|---|
| 0.787 ≧ C(i) > 0.766 | 0.787 | 111.0 |
| 0.766 ≧ C(i) > 0.745 | 0.766 | 108.0 |
| 0.745 ≧ C(i) > 0.723 | 0.745 | 105.0 |
| 0.723 ≧ C(i) > 0.702 | 0.723 | 102.0 |
| 0.702 ≧ C(i) | 0.702 | 99.0 |

Then, the correction information C(i) calculated for every luminous dot 7 is stored in the memory device 26 for light-amount correction of the optical printer head 1. When the light-amount correction is carried out, the correction information C(i) for the memory device 26 is read out of the optical printer head 1, so that control data on a pulse width depending on the correction information C(i) are inputted to the anode driver 14. More particularly, as indicated at a solid line in FIG. 5(b), a pulse width of the control data inputted to the anode driver 14 depending on the correction information in the memory device 26 is variably controlled so as to be merged into the minimum value Lmin of the light amount of the luminous dots 7 within the effective printing range H while using the minimum value Lmin as a reference light-amount level.

Also, when the correction information C(i) is stored in the memory device 26 during correction of the light amount, data on the luminous dots 7 in the ineffective printing range h omitted from the correction information are concurrently stored as such information as outputted without correction in the memory device 26.

Thus, the illustrated embodiment, as shown in FIG. 5(a), is so constructed that the light-amount correction is carried out without subjecting the luminous dots 7 in the ineffective printing range h out of the effective printing ranger H to the light-amount correction, as indicated at the solid line in FIG. 5(b). Such construction permits a level of a light amount of all luminous dots 7 after the correction to be increased, because it permits an increase in reference light-amount level as compared with the prior art wherein a minimum light amount of the luminous dots 7 reduced due to the end cool phenomenon caused by the filamentary cathodes is set to be a reference light-amount level.

In addition, in the illustrated embodiment, only the luminous dots 7 within the effective printing range H other than the ineffective printing range h are subject to the light-amount correction, resulting in the light-amount level being increased without causing a deterioration in quality of an image. The deterioration in image quality does not indicate loss of exposure energy. It means formation of lines or streaks on the record medium due to non-uniform light-amount correction.

Further, the illustrated embodiment, as described above, is so constructed that the luminous dots 7 in the ineffective printing range h out of the effective printing range H are not subject to the light-amount correction. Such construction minimizes a drive voltage required for correction of the luminous dots 7 in the ineffective printing range h. This is for the reason that the light-amount correction of the luminous dots 7 within the ineffective printing range h as well as those within the effective printing range H requires to increase a voltage during the exposure when energy of the luminous dots 7 after the correction is to be maintained at a constant level. Thus, the illustrated embodiment permits a reduction in drive voltage required for the exposure. Such a reduction in drive voltage results in a variation in light amount of the luminous dots 7 with time being reduced.

Alternatively, the illustrated embodiment may be so constructed that the luminous dots 7 in the ineffective printing range h excluded from the correction information C(i) each are used as a dummy dot, resulting in data on the luminous dot 7 in the ineffective printing range h being stored as such information as constantly outputted for luminescence in the memory device 26.

This, when the film 24 which exhibits a white color due to exposure thereof to light emitted from the luminous dots 7 is used, permits formation of a white frame at each of both ends of the record medium due to continued luminescence of the dummy dots, thus, the luminous dots 7 within the ineffective printing range h excluded from the correction information C(i) may be effectively used.

Color printing of three colors or red (R), green (G) and blue (B) colors using the optical printer in which the above-described light-amount correction is carried out may be attained by providing a single optical printer head 1 with a switchable three-color filter exhibiting R, G and B colors. Alternatively, it may be accomplished by providing three such optical printer heads 1 with three filters of R, G and B colors, respectively. Also, it may be attained by providing three such optical printer heads 1 with the phosphor layers 11 exhibiting R, G and B luminous colors, to thereby permit the luminous dots 7 to exhibit R, G and B luminous colors, respectively.

Furthermore, in the illustrated embodiment, the memory device 26 is mounted on the circuit board 13 of the optical printer head 1 by way of example. Alternatively, it may be arranged in the envelope 6 of the optical printer head 1 together with the anode driver 14 acting as a drive device.

In the illustrated embodiment, the fluorescent luminous tube is used as the light source for the optical printer head. However, the light source may be constituted by any other suitable light source means such as a field emission display, a light emitting diode, a plasma display panel, an inorganic or organic electroluminescent device, a combination of a liquid crystal shutter and a back light, a combination of a ferromagnetic ceramic shutter and a back light, or the like. Alternatively, a composite light source formed by any suitable combination of the above-described light source means may be used as the light source.

As can be seen form the foregoing, the optical printer head of the present invention is so constructed that the luminous dots other than the luminous dots positioned in proximity to both ends of the luminous dot trains and reduced in light amount due to an end cool phenomenon caused by the filamentary cathodes are subject to the light-amount correction, to thereby provide correction information, which is then stored in the memory device. Such construction of the present invention permits an increase in reference light-amount level, leading to an increase in light-amount level of all luminous dots after the correction.

Also, the luminous dots positioned in proximity to both ends of the luminous dots which are omitted or excluded from the light-amount correction positionally correspond to the ineffective printing range, so that only the luminous dots within the effective printing range other than the ineffective printing range are subject to the light-amount correction, resulting in eliminating a deterioration in quality of an image, leading to an increase in light-amount level.

Further, the luminous dots within the ineffective printing range out of the effective printing range are not subject to the light-amount correction, so that a drive voltage required for light-amount correction of the luminous dots within the ineffective printing range may be eliminated. This permits both a drive voltage required for the exposure and a variation in light amount of the luminous dots with time to be reduced.

In addition, in the optical printer head of the present invention, the luminous dots in the ineffective printing range excluded from the correction information each may be used a dummy dot, so that use of the record medium which exhibits a white color due to exposure thereof to light emitted from the luminous dots permits formation of a white frame at both ends of the record medium due to continued luminescence of the dummy dots, thus, the luminous dots within the ineffective printing range excluded from the correction information may be effectively used.

The light-amount correction method of the present invention is so constructed that the correction information on the luminous dots other than those positioned in proximity to both ends of the luminous dot trains is stored in the memory device without subjecting the luminous dots positioned in proximity to both ends of the luminous dot trains to the light-amount correction, resulting in the luminous dots other than those positioned in proximity to both ends of the luminous dot trains being subject to the light-amount correction. This permits the light-amount correction to be carried out so as to accommodate to a reduction in light amount of the luminous dots positioned in proximity to both ends of the luminous dot trains which is due to an end cool phenomenon mainly caused by the filamentary cathodes.

Moreover, the optical printer of the present invention is so constructed that the luminous dots other than those positioned in proximity to both ends of the luminous dot trains are subject to the light-amount correction without subjecting the luminous dots positioned in proximity to both ends of the luminous dot trains to the light-amount correction, to thereby obtain correction information on the luminous dots other than those positioned in proximity to both ends of the luminous dot trains, which is then stored in the memory device. This permits the light source to be driven depending on the correction information, resulting in an image at increased quality being formed on the record medium.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An optical printer head comprising:
   a light source formed of luminous dot trains each including a plurality of luminous dots;
   a memory device configured to store correction information, said correction information being obtained by subjecting light amount emitted from each of said luminous dots to adjust so as to illuminate each of said luminous dots at a substantially same level;
   a control unit for processing said correction information supplied from said memory device; and
   an anode driver for driving each of said luminous dots based on control data from said control unit:
   wherein said correction information stored in said memory device is derived from the light amount of the luminous dots in an effective printing range of said luminous dot trains other than the luminous dots in an ineffective printing range of said luminous dot trains while omitting the luminous dots in said ineffective printing range from said light-amount correction, and each of said luminous dots in said effective printing range of said luminous dot trains are illuminated based on the correction information and each of said luminous dots in said ineffective printing range of said luminous dot trains are kept constantly luminous without adjusting the light amount so as to form a white frame on a record medium.

2. An optical printer head comprising:

a light source formed of luminous dot trains each including a plurality of luminous dots, said light source including an anode arranged on an anode substrate and a phosphor layer deposited on said anode, and filamentary cathodes arranged above said luminous dot trains so as to extend along said luminous dot trains;

a memory device configured to store correction information, said correction information being obtained by subjecting light amount emitted from each of said luminous dots to adjust so as to illuminate each of said luminous dots at a substantially same level;

a control unit for processing said correction information supplied from said memory device; and an anode driver for driving each of said luminous dots based on control data from said control unit:

wherein said correction information stored in said memory device is derived from the light amount of the luminous dots in an effective printing range of said luminous dot trains other than the luminous dots in an ineffective printing range of said luminous dot trains while omitting the luminous dots in said ineffective printing range from said light-amount correction, and each of said luminous dots in said effective printing range of said luminous dot trains are illuminated based on the correction information and each of said luminous dots in said ineffective printing range of said luminous dot trains are kept constantly luminous without adjusting the light amount so as to form a white frame on a record medium.

3. An optical printer head as defined in claim 1 or 2, wherein said luminous dots in said ineffective printing range each exhibit a light amount of about 80% or less based on an average light amount of said luminous dot trains.

4. An optical printer head as defined in claim 1 or 2, wherein said correction information is based on a minimum value of a light amount of the luminous dots in said effective printing range.

5. An optical printer comprising:

a light source formed of luminous dot trains each including a plurality of luminous dots;

a record medium irradiated thereon with light from said light source, resulting an image being formed thereon;

a transfer means for moving said light source and record medium relative to each other;

a control means for driving said transfer means and light source inb synchronism with each other;

a memory device configured to store correction information, said correction information being obtained by subjecting light amount emitted from each of said luminous dots to adjust so as to illuminate each of said luminous dots at a substantially same level;

a control unit for processing said correction information supplied from said memory device; and an anode driver for driving each of said luminous dots based on control data from said control unit:

wherein said correction information stored in said memory device is derived from the light amount of the luminous dots in an effective printing range of said luminous dot trains other than the luminous dots in an ineffective printing range of said luminous dot trains while omitting the luminous dots in said ineffective printing range from said light-amount correction, and each of said luminous dots in said effective printing range of said luminous dot trains are illuminated based on the correction information and each of said luminous dots in said ineffective printing range of said luminous dot trains are kept constantly luminous without adjusting the light amount so as to form a white frame on a record medium.

6. An optical printer comprising:

a light source formed of luminous dot trains each including a plurality of luminous dots, said light source including an anode arranged on an anode substrate and a phosphor layer deposited on said anode, and filamentary cathodes arranged above said luminous dot trains so as to extend along said luminous dot trains;

a record medium irradiated thereon with light from said light source, resulting in an image being formed thereon;

a transfer means for moving said light source and record medium relative to each other;

a control means for driving said transfer means and light source in synchronism with each other;

a memory device configured to store correction information, said correction information being obtained by subjecting light amount emitted from each of said luminous dots to adjust so as to illuminate each of said luminous dots at a substantially same level;

a control unit for processing said correction information supplied from said memory device; and an anode driver for driving each of said luminous dots based on control data from said control unit:

wherein said correction information stored in said memory device is derived from the light amount of the luminous dots in an effective printing range of said luminous dot trains other than the luminous dots in an ineffective printing range of said luminous dot trains while omitting the luminous dots in said ineffective printing range from said light-amount correction, and each of said luminous dots in said effective printing range of said luminous dot trains are illuminated based on the correction information and each of said luminous dots in said ineffective printing range of said luminous dot trains are kept constantly luminous without adjusting the light amount so as to form a white frame on a record medium.

7. An optical printer as defined in claim 5 or 6, wherein said correction information is based on a minimum value of a light amount of the luminous dots in said effective printing range.

* * * * *